United States Patent
Padgett (10) Patent No.: US 12,254,248 B2
(45) Date of Patent: Mar. 18, 2025

(54) YARN PLANNER FOR TUFTED PATTERNS AND CREELING

(71) Applicant: Tuftco Corporation, Chattanooga, TN (US)

(72) Inventor: Rob Padgett, Chattanooga, TN (US)

(73) Assignee: Tuftco Corporation, Chattanooga, TN (US)

(*) Notice: Subject to any disclaimer, the term of this patent is extended or adjusted under 35 U.S.C. 154(b) by 136 days.

(21) Appl. No.: 17/879,284

(22) Filed: Aug. 2, 2022

(65) Prior Publication Data
US 2022/0398363 A1    Dec. 15, 2022

Related U.S. Application Data

(63) Continuation-in-part of application No. 16/870,968, filed on May 9, 2020, now Pat. No. 11,401,643.

(60) Provisional application No. 62/845,681, filed on May 9, 2019.

(51) Int. Cl.
G06F 30/20    (2020.01)
D05C 15/26    (2006.01)
G06F 113/12   (2020.01)

(52) U.S. Cl.
CPC ............. G06F 30/20 (2020.01); D05C 15/26 (2013.01); *G06F 2113/12* (2020.01)

(58) Field of Classification Search
CPC ...... D05C 15/26; G06F 30/20; G06F 2113/12
See application file for complete search history.

(56) References Cited

U.S. PATENT DOCUMENTS

| | | | |
|---|---|---|---|
| 2017/0204546 A1* | 7/2017 | Padgett | D05C 5/04 |
| 2018/0011491 A1* | 1/2018 | Morton | B65H 49/16 |
| 2020/0031608 A1* | 1/2020 | Kurtz | B65H 67/065 |

* cited by examiner

Primary Examiner — Nathan E Durham
(74) Attorney, Agent, or Firm — Miller & Martin PLLC (57) ABSTRACT

A tufting machine interface or simulator is provided with yarn planning software enabling the optimization of winding yarn cones for particular patterns and production runs to minimize waste yarn and labor attendant to rewinds.

6 Claims, 9 Drawing Sheets

YARN PLANNER FOR TUFTED PATTERNS AND CREELING

CLAIM OF PRIORITY

The present application is a continuation in part of U.S. application Ser. No. 16/870,968 filed May 9, 2020, which claims the benefit of U.S. Provisional Patent Application No. 62/845,681 filed May 9, 2019.

FIELD OF THE INVENTION

The invention relates to the efficient manufacture of patterned textiles, and more particularly improved yarn planning for the design and manufacture of tufted patterned textiles.

BACKGROUND OF THE INVENTION

In the manufacture of patterned textiles, and particularly in the manufacture of tufted textile products, designs are created for fabrics in a pixel-mapped format where each pixel in a graphic representation corresponds to a separate tuft or bight of yarn that is displayed on the surface of the tufted carpet. Pixel-mapped designs became prevalent as a result of the evolution of tufting machine capabilities to place a particular color of yarn at virtually any location in a given pattern. In the field of broadloom tufting machines, this capability was present in the mid-to-late 1990s with computer controlled needle bar shifters, servo motor driven backing feeds, and servo motor driven yarn feed pattern controls. However, even decades earlier simple patterns could be tufted in a similar fashion as typified by Hammel, U.S. Pat. No. 3,103,187 using photo-electric cells to read instructions for actuation of electromagnetic clutch operated yarn feeds. Increases in computational power, as well as the speed and accuracy of electronic controls, have made the tufting of pixel-mapped designs a commercial reality.

Other types of tufting machines such as hollow needle machines manufactured by Tapistron, or the Colortron/iTron machines manufactured by Tuftco Corp. have the ability to place any color of yarn in any location of the backing fabric. Individual control needle ("ICN") machines typified by Cobble's ColorTec machines, also could place any color yarn at any position on backing fabric from about 1994.

Tufted textile fabrics may be manufactured from a single color of yarn threaded in all the needles of a tufting machine. However, in commercial and hospitality markets, it is more common that patterns will have between about three to six colors of yarn, and in some cases, even more. When using multiple colors of yarn in a pattern, it often happens that some colors are utilized more heavily than others and particular needles on the tufting machine may utilize more of one color yarn than is utilized by other needles tufting the same color. These variations in yarn consumption can lead to a variety of inefficiencies.

The production of completed tufted textiles generally involves several distinct steps. First is the selection or creation of a pattern. Second is the creeling of a tufting machine so that it is capable of delivering the yarns required in the pattern. Third is the tufting of a greige fabric by placing the yarns in a backing fabric according to the pattern. Finally, there are finishing steps to remove irregularities, to lock the tufted yarns in place with the application of a secondary backing, and to trim any uneven margins as the fabric is cut to size.

The creation of tufted greige fabric involves feeding yarns through a yarn creel (or other yarn supply) to needles on a tufting machine, and reciprocating the needles to insert the yarns through the backing fabric. By controlling operations such as the lateral shifting of needles and backing fabric relative to one another, the longitudinal feeding of the backing fabric, the amounts of yarn fed to specific needles for each stitch, the types of knives and gauge parts operating to seize or cut yarns carried through the backing fabric, and in the case of ICN tufting machines, the selection of needles to penetrate the backing fabric, almost any design can be created on a properly configured and threaded tufting machine.

The inputs necessary to create the tufted fabric include labor, yarn, backing fabric and the typically multi-million dollar investment in a tufting machine and yarn creel. Such tufting machines, while built on a chassis not unlike those from the last century, now include sophisticated electronics and software in addition to the many precision reciprocating and electronically controlled assemblies that operate to move the yarns, gauge parts, and backing as required.

With the evolution of tufting machines, the possibilities for patterns have evolved from solids, textures, geometrics, repeated graphics, and simulations of woven textiles, to encompass nearly photographic embodiments of a wide range of images. Furthermore, patterns may now be over 1000 positions in both width and length, leading to designs with over a million individual pixel-mapped positions.

Since a tufting machine is a sizable fixed investment that should justify its cost over several years of production, the opportunities to minimize the overall cost of creating tufted fabrics must focus on the labor and materials consumed in that production. Labor is involved in creating designs and in configuring and operating tufting machines for each individual pattern to be produced. Configuring tufting machines for a pattern largely involves the positioning of yarn cones in a yarn creel or the winding of beams to feed yarns to the needles, and threading of yarns to the individual needles. Many other pattern configuration steps can be carried out by electronic controls, typically from the tufting machine operator interface. It is difficult to reduce the cost of yarn positioning and threading without significant capital investment in automated systems.

In addition, there is wasted yarn when patterns do not utilize similar amounts of colors of yarn fed to needles across the width of the tufting machine. This leads to two inefficiencies. First, if for example a red yarn is fed to a needle on the right side of the tufting machine and will consume a three pound yarn cone over the course of production of a pattern while a red yarn fed to a needle in the center of that machine will consume a four pound yarn cone, some compromise must be made. For instance four pound yarn cones could be placed in all positions on the creel for red yarns. In this case, an extra pound of yarn will be left on the cones that are associated with needles only using three pounds of red yarn and that yarn will need to be salvaged. Alternatively, three pound and four pound yarn cones may be prepared and positioned in appropriate places on the creel to feed yarns to the appropriate needles. This second alternative involves additional labor, and the increased possibility of improper configuration of the yarn creel is injected into the configuration process. A third alternative is to prepare only three pound yarn cones of red yarn and to incur the additional labor of either replacing the empty yarn cones that are exhausted during tufting on the needles requiring four pounds of yarn or performing rewinds to add additional yarn to those cones. Any unused yarn on these cones will still need to be salvaged similar to the case where only four pound yarn cones are used and there is an excess on the needles only requiring three pounds as in the first alternative.

One solution to minimizing the waste of yarn and additional labor is to optimize the yarn consumption in patterns so that yarn consumption is evenly balanced across the needles of a tufting machine, or at least balanced across needles for specific colors, used in particular patterns on a tufting machine as described in U.S. Pat. No. 9,915,017. The techniques described in this patent are most suitable for carpet patterns that have organic or natural aspects, perhaps with the appearance of falling leaves or similar designs inspired by nature or entropy, which have been popular in relatively recent years as commercial or hospitality carpet patterns. However, this solution requires modifications to the actual pattern being tufted and such modifications are not suitable for all types of patterns. Accordingly, improved yarn planning and optimization techniques are needed when it is not practical to alter patterns to significantly change the yarn consumption on a needle by needle basis.

SUMMARY OF THE INVENTION

Sophisticated manufacturers employ modern supply chain techniques to manage inventories and eliminate unnecessary costs and waste materials. Production on particular tufting machines may be planned weeks or even months in advance and inventories of necessary yarns and backing ordered or manufactured. In order to optimize yarn planning for a particular pattern, it is desirable to provide the yarn planning supply chain with information for needle-by-needle yarn consumption and tools to facilitate the selection of yarn lengths to be wound on yarn cones for creel that will optimize the combined amount of waste yarns and labor associated with rewinds (or deploying additional yarn cones) during a pattern run. To provide these features, software must be adaptable to compute yarn consumption for the particular tufting machine on which the pattern is to be run, and yarn consumption by needle and color must be readily available for analysis. The complexity of such computations have multiplied in the last decade as it is now possible that a pattern having essentially the same appearance may be tufted upon a variety of different machines. For instance, tufting machines having one or two rows of needles, employing traditional tufting, ICN, or hollow needle yarn placement, utilizing different gauge needle bars with backing shifting and other variations may all be utilized in appropriate circumstances to create nearly photographic embodiment of patterns. While each machine can produce a pattern with the desired appearance on the face of the tufted greige, there may be considerable differences in yarn consumption due to the varying stitch rates and backing stitch constructions from machine to machine, and even among different machine configurations in the field of traditional broad loom tufting.

BRIEF DESCRIPTION OF THE DRAWINGS

The particular features and advantages of the invention as well as other objects will become apparent from the following description taken in connection with the accompanying drawings in which.

DETAILED DESCRIPTION OF THE INVENTION

Figure 1A:
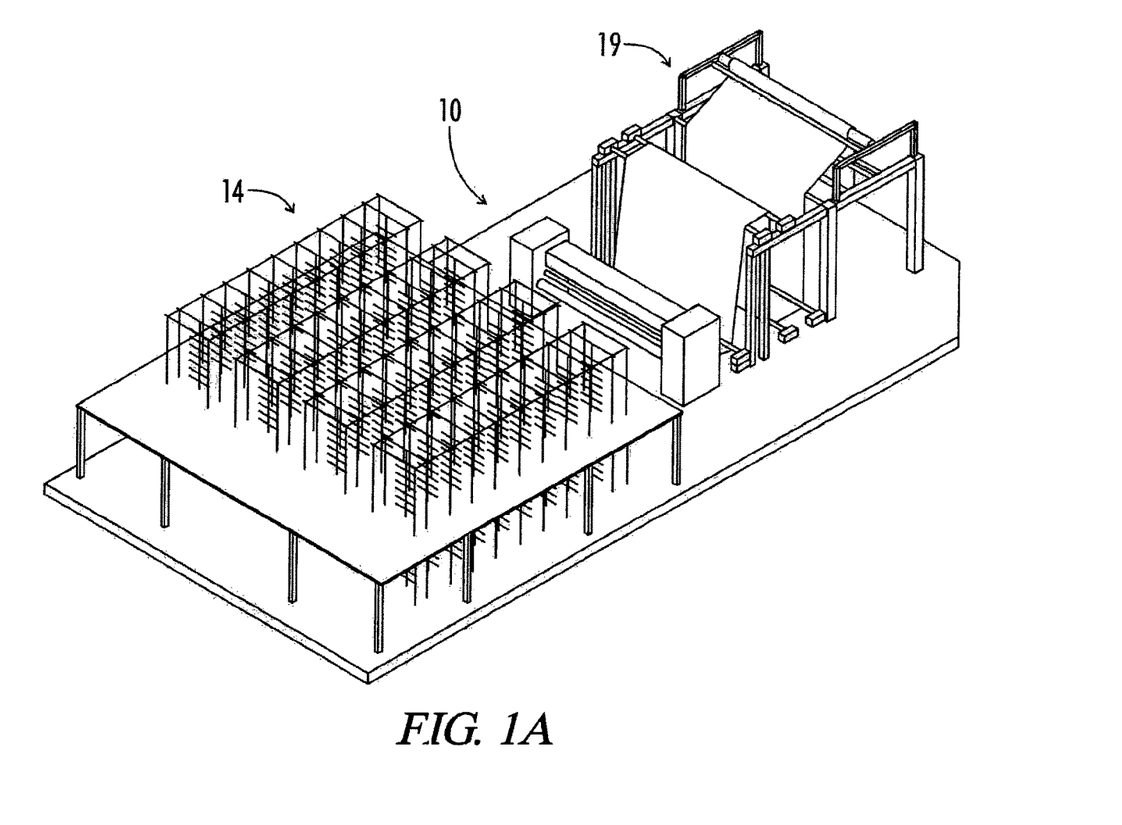
FIG. 1A is a perspective view of a tufting machine and creel.

Turning then to FIG. 1A, a general depiction of the tufting machine 10 with take up rolls 19 for the tufted fabric and two-story creel 14 to hold cones of yarn is illustrated. It will be understood that the invention can be practiced on a wide variety of tufting machines, not simply the broadloom machine 10 represented in FIG. 1A. For instance, ColorTec ICN machines and Colortron/iTron hollow needle tufting machines also have the capability to place yarns in individual pixel locations according to a pattern and thus are suitably adapted for use with the invention. In addition, the yarn creel set up is exemplary and yarns could be supplied to the tufting machine from a single-story creel or from beams that are wound for use in supplying yarns. In the typical case there will be hundreds of separate yarns fed from the creel, most frequently between about 600 and 1800 yarns and most commonly between about 1100 and 1700 yarns, although some machine and pattern combinations, such as relatively narrow hollow needle machines tufting patterns with a limited number of colors, could operate with a much smaller number and perhaps only about 200 yarns.

Figure 1B:
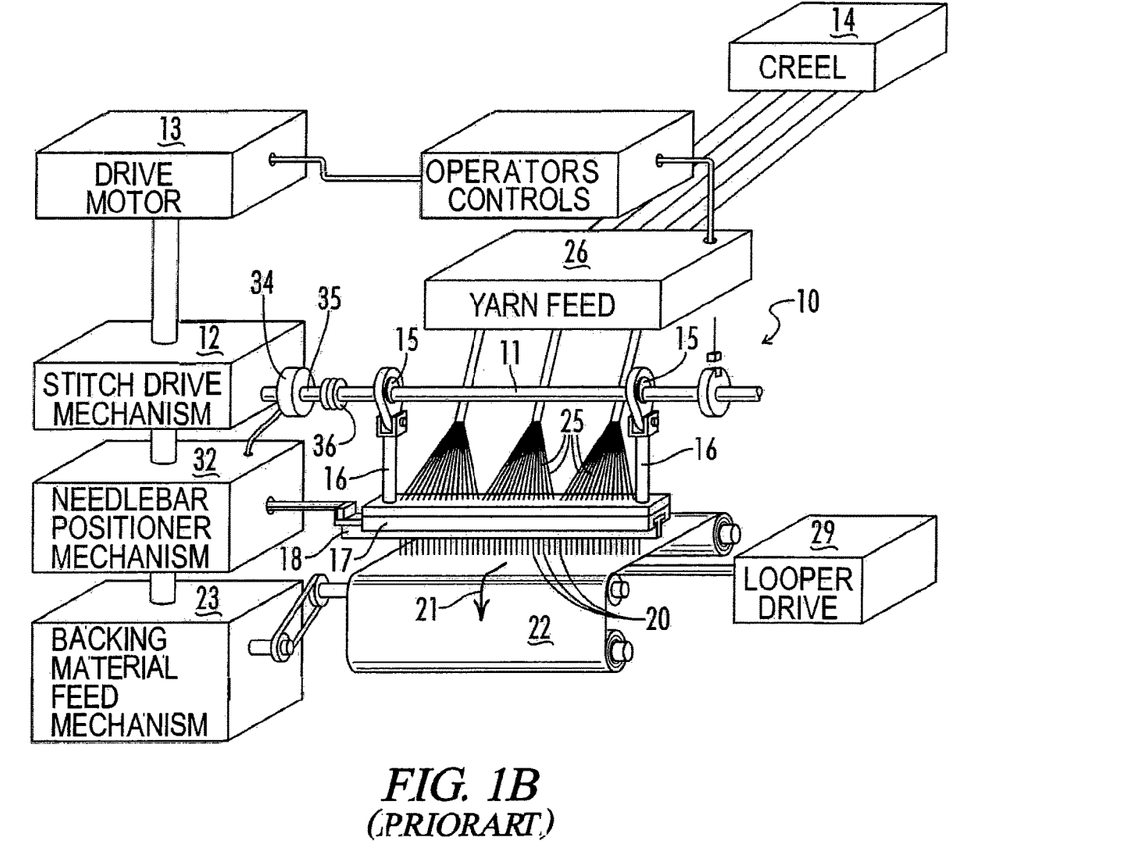
FIG. 1B is a schematic diagram of a tufting machine and creel.

The tufting machine 10 disclosed in FIG. 1B includes a rotary needle shaft or main drive shaft 11 driven by stitch drive mechanism 12 from a drive motor or other conventional means. Rotary eccentric mechanism 15 mounted upon rotary needle shaft 11 is adapted to reciprocally move the vertical push rod 16 for vertically and reciprocally moving the needle bar slide holder 17 and needle bar 18. The needle bar 18 supports a plurality of uniformly spaced tufting needles 20 in a longitudinal row, or staggered longitudinal rows, extending transversally of the feeding direction of the backing fabric or material 22. The backing fabric 22 is moved longitudinally in direction 21 through the tufting machine 10 by the backing fabric feed mechanism 23 and across a backing fabric support with needle plate and needle plate fingers.

Yarns 25 are fed from the creel 14 to the pattern control yarn feed 26 to the respective needles 20. As each needle 20 carries a yarn 25 through the backing fabric 22, a hook is reciprocally driven by the looper drive 29 to cross each corresponding needle 20 and hold the corresponding yarn end 25 to form loops. Cut pile tufts are formed by cutting the loops with knives.

The needle bar shifting apparatus 32 is designed to laterally or transversely shift the needle bar 18 relative to the needle bar holder 17 a predetermined transverse distance equal to the needle gauge or multiple of the needle gauge, and in either transverse direction from its normal central position, relative to the backing fabric 22, and for each stroke of the needles 20. It will be understood that the lateral displacement of needles relative to the backing fabric 22 may also be achieved by the use of a backing fabric shifter, or by the combination of a backing fabric shifter with needle bar positioners for one or more needle bars. When using a backing fabric shifter, the shifting is not constrained to shifting in needle gauge increments.

In order to generate input encoder signals for the needle bar shifting apparatus 32 corresponding to each stroke of the needles 20, an encoder 34 may be mounted upon a stub shaft 35, or in another suitable location, and communicate positional information from which the tufting machine controller can determine the position of the needles in the tufting cycle. Alternatively, drive motors may use commutators to indicate the motor positions from which the positions of the associated driven components may be extrapolated by the controller. Operator controls 24 also interface with the tufting machine controller to provide appropriate instructions and pattern information.

On a broadloom tufting machine, these components can be operated in a fashion to provide pixel-addressed yarn placement as described in various prior patents such as U.S. Pat. Nos. 6,439,141; 7,426,895; and 8,359,989 and continuations thereof. Pixel controlled yarn placement in connection with ICN machines is described in U.S. Pat. Nos. 5,382,723 and 5,143,003; while pixel controlled placement of yarns utilizing hollow needle tufting machines is described in U.S. Pat. Nos. 4,549,496 and 5,738,030. Similar yarn placement may be achieved utilizing backing shifting as is disclosed in PCT/US17/54683 filed Sep. 30, 2017. All these patents and applications are incorporated herein by reference.

Figure 2:
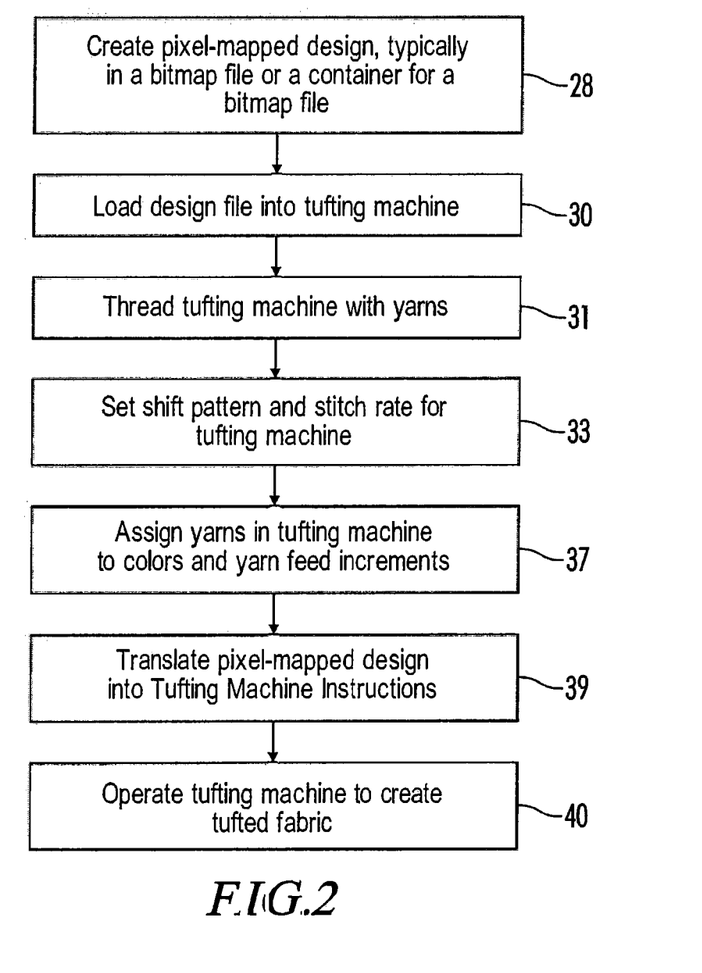
FIG. 2 is a flow diagram illustrating exemplary steps presently used in designing and manufacturing tufted fabric.

Turning then to the process of designing and manufacturing tufted fabric as reflected in FIG. 2, the first step 28 is the creation of a graphic design to be tufted. The design can be created by an artist or adapted from a photograph or preexisting image. In either case, the image should be created or processed to limit the color palette to a manageable number of yarn colors, preferably between two and twelve, and most commonly three to six colors.

Figure 4:
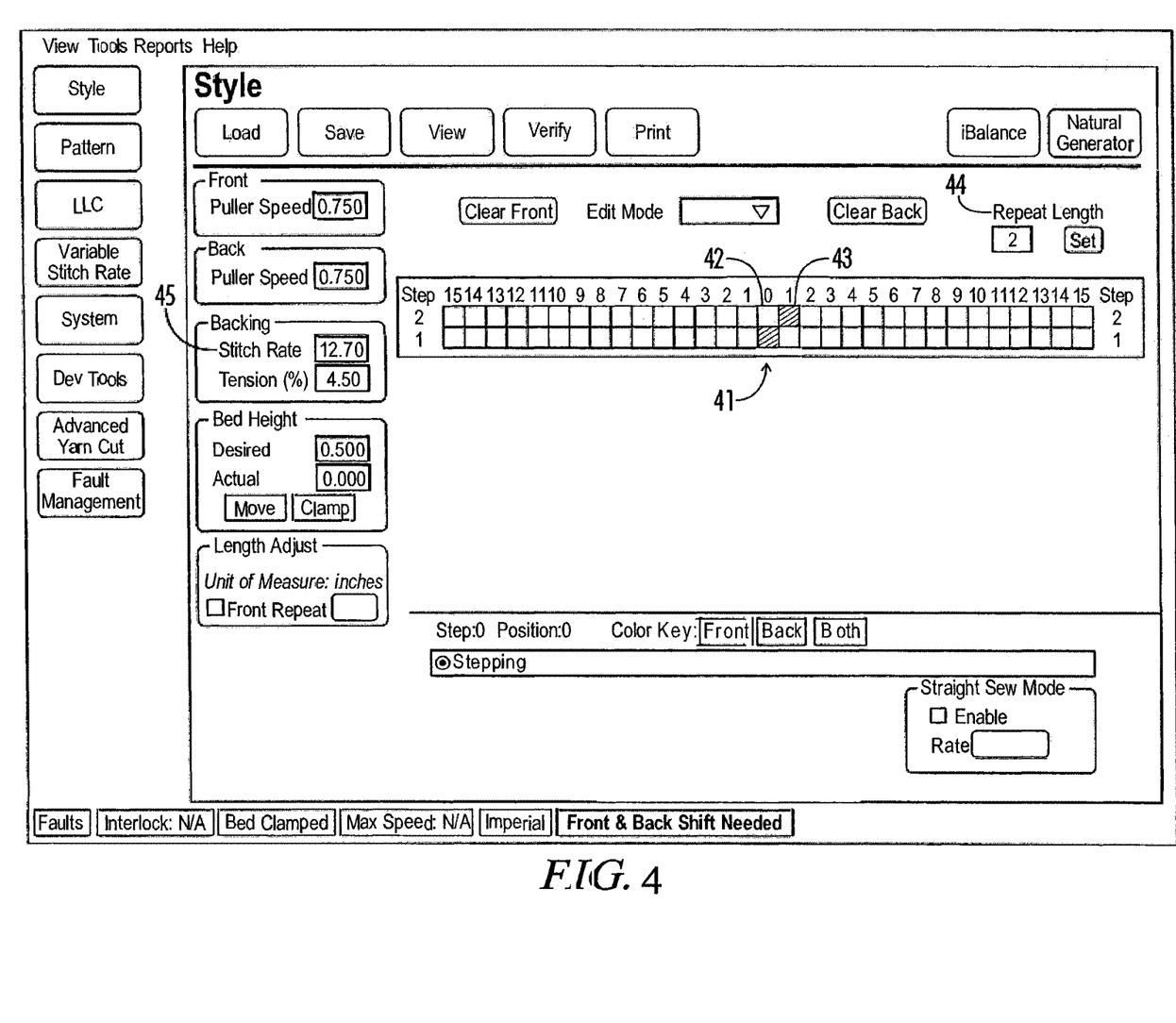
FIG. 4 is an exemplary control screen display for the input of design and tufting parameters, especially in needle bar shift profile.
Figure 5A:
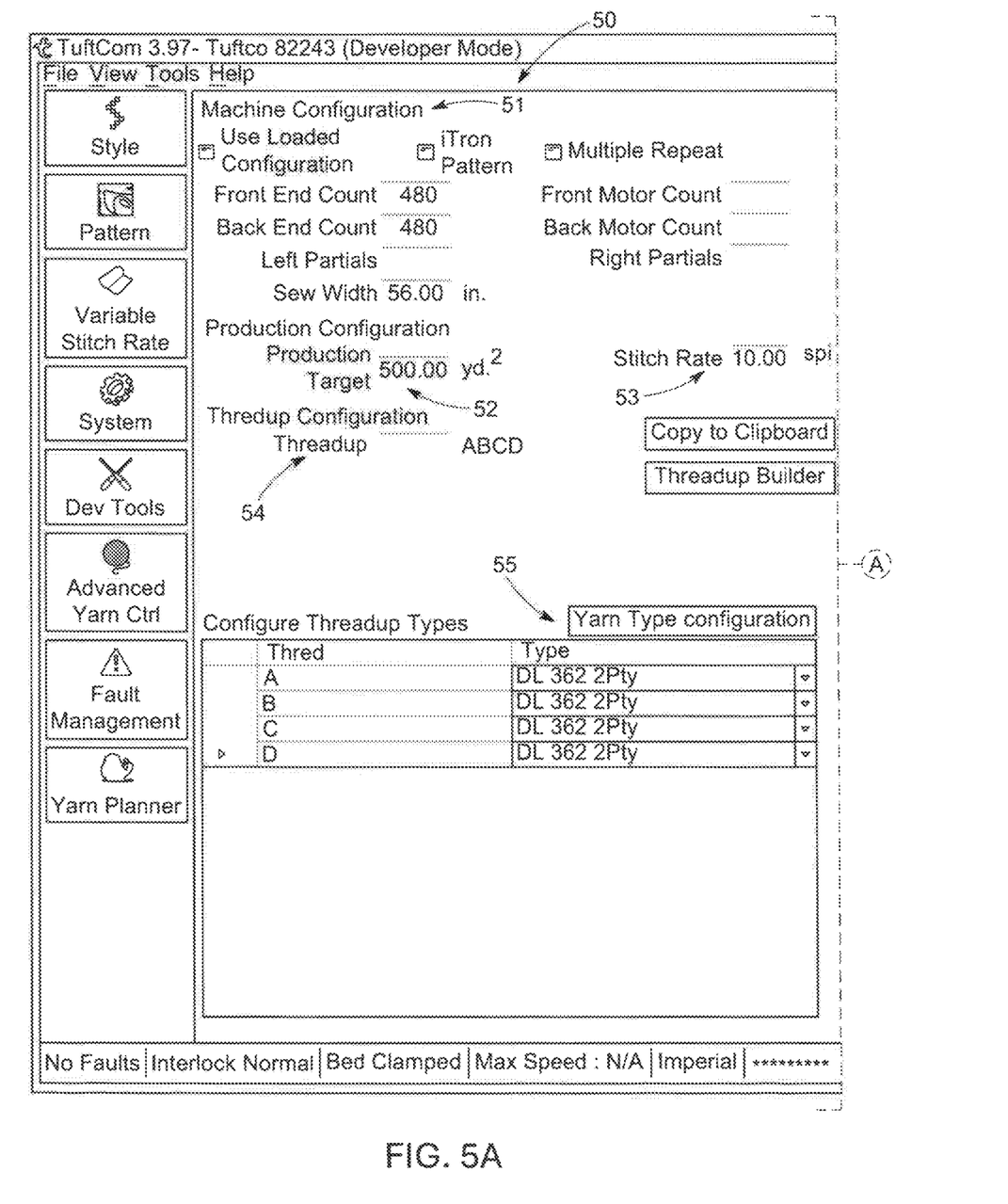
FIGS. 5A and 5B is show an exemplary control screen display for computing yarn consumption based upon machine and yarn type configurations.
Figure 5B:
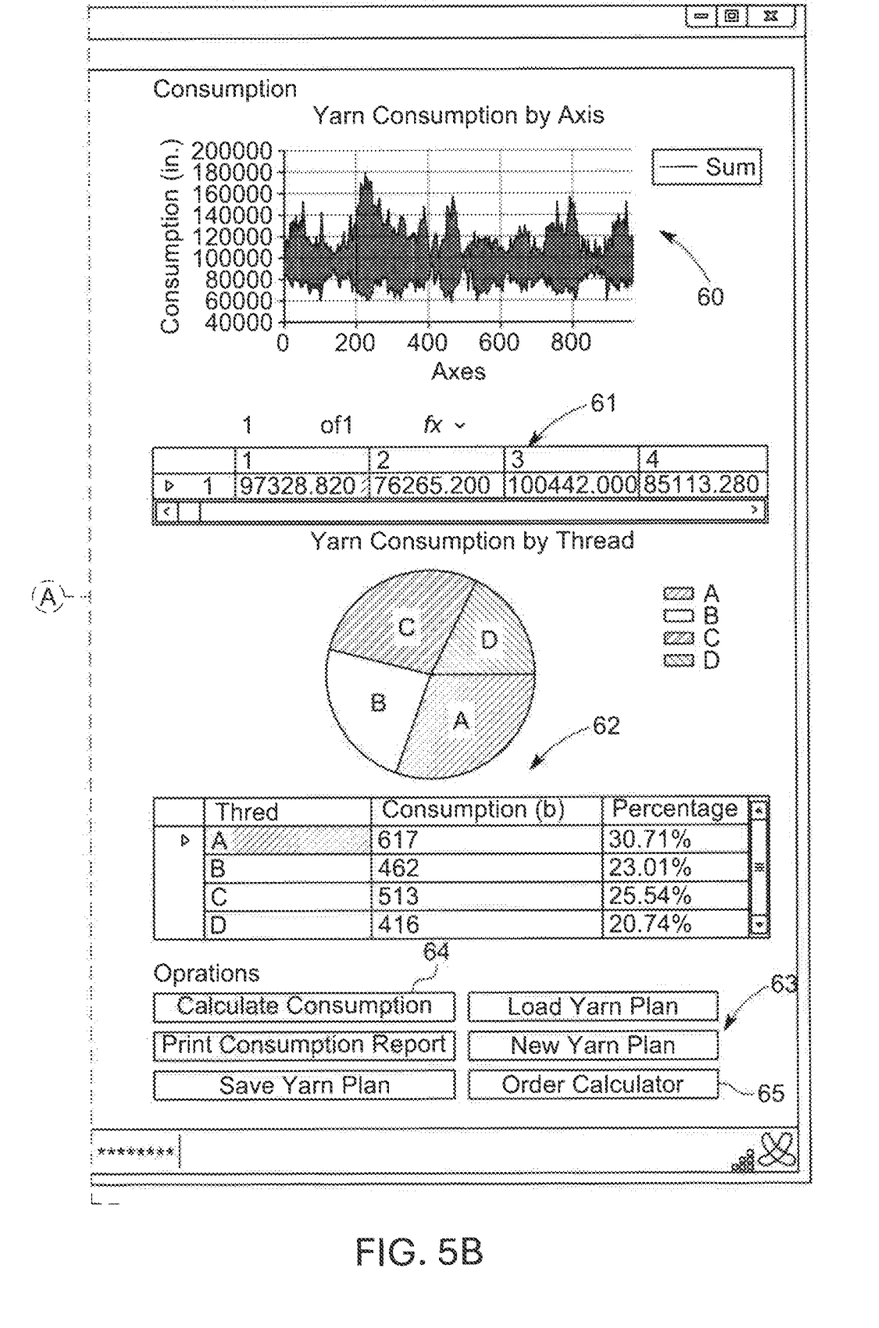

The next step 30 is to load the image into a tufting machine having a controller running a control software system such as the iTuft or Tuftworks system sold by Tuftco Corp. and to process the pattern graphics to create machine instructions. When using the iTuft system, there are two principal steps prior to creating machine instructions. One step 33 (in FIG. 2), carried out as reflected in FIG. 4, is to assign a shift pattern or step pattern 41 to the needle bar 37 (shown in FIG. 2) and a stitch rate to the pattern. In the case of a two-color pattern, it is quite practical to use a very simple stepping pattern of over and back so that the needle bar merely moves from dead center 42 to a position offset by one gauge unit 43 and then repeats. In this case, the repeat length 44 is only two steps. In the event that a four-color pattern were being tufted, typical stepping pattern would involve two steps to the right, four steps to the left, and two steps to the right. Variations of the shift profile for other numbers of colors utilized on a broadloom tufting machine are well known and easily computed. It can also be seen that the stitch rate 45 may be specified which can affect the density of yarn bights and the weight of the resulting tufted fabrics.

In addition to entering the stepping pattern in FIG. 4, in the iTuft system the yarns and yarn feed increments are assigned to the colors in the graphic pattern 37 (in FIG. 2). In the prior art, at this point the pixel-mapped design can be translated into tufting machine instructions 39 and the tufting machine 10 operated with the tufting machine instructions 39 to produce a tufted fabric of the design 40.

Figure 3:
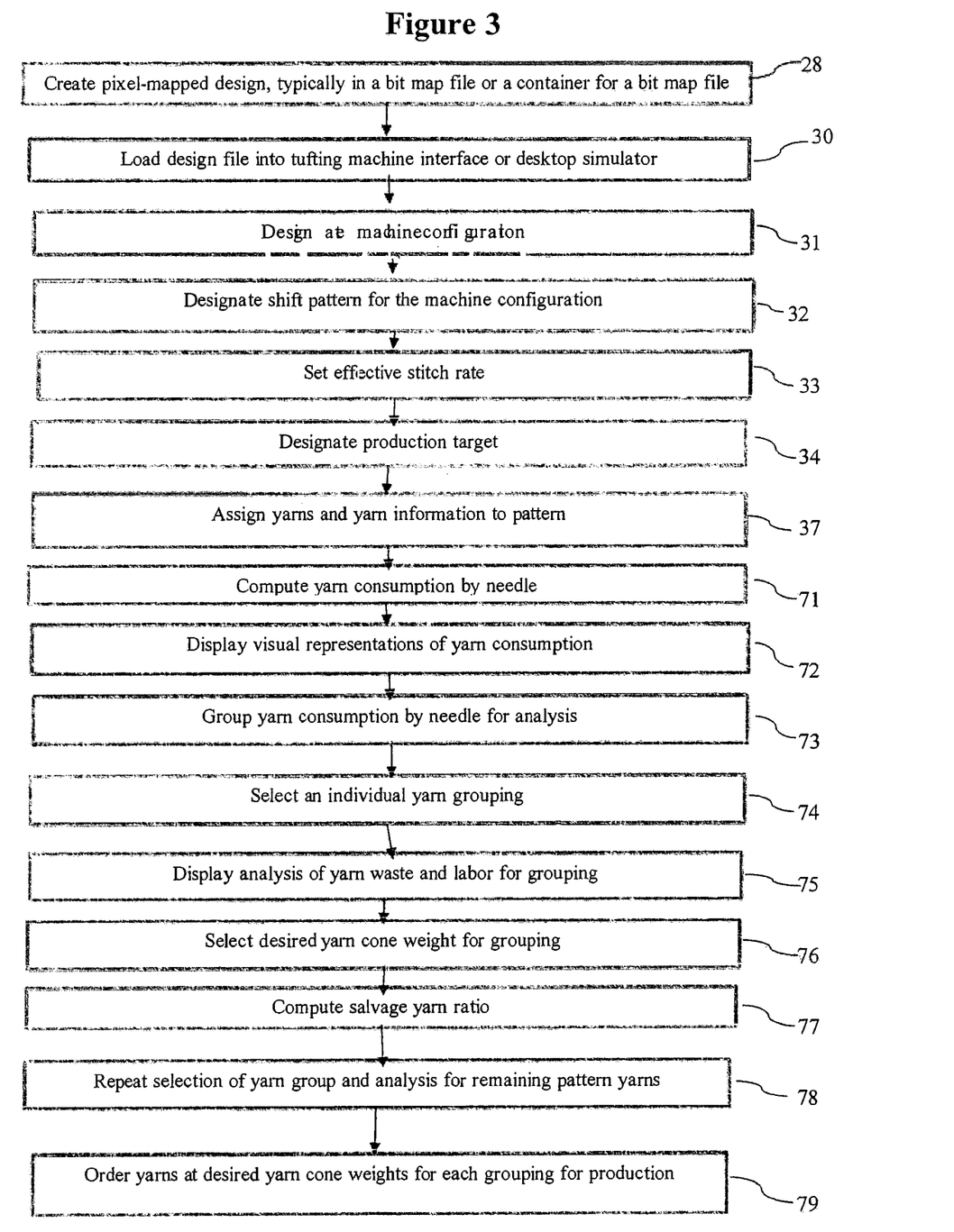
FIG. 3 is a flow diagram of exemplary steps in practicing a yarn planning method in connection with designing patterns to manufacturing tufted fabrics.

Using the yarn planning techniques of the invention requires some modifications to the prior art process. The pixel-mapped design is created as before 28 but then the design file is loaded into a tufting machine, or possibly a desk top simulator 30 where the physical characteristics of the tufting machine have been stored, or may be specified. The shift pattern and stitch rate may be set 33 and yarn feed increments assigned to colors in the design 37. After the pattern has been associated with yarns, yarn feed increments, and a stepping pattern for a particular tufting machine, it is then possible to compute the yarn consumption for each needle 71 as shown in FIG. 3. In fact the tufting machine instructions 39 may be utilized to provide calculations involving combining the lengths of yarn that are utilized in shifting yarns from one position to another in addition to the lengths of yarn that are actually fed and tufted into the backing fabric. This calculation varies depending upon the type of tufting machine, the needle bar gauge and configuration (single, staggered, graphics), lateral shifting mechanism(s) and stitch rates. The earlier versions of yarn planning, even by the applicant lacked the ability to utilize the tufting machine instructions 39 to calculate yarn length.

Calculating yarn consumption involves the specification of the characteristics of the tufting machine 51. This tufting machine configuration may be uniform for some types of machines or may require specific machine information or preloaded configuration to be input. If the yarn planning software is being run on a particular tufting machine rather than at a remote workstation, the characteristics of that machine may be entered by default to provide the tufting machine instructions 39. In addition, the production target 52 will be specified and the stitch rate 53, thread-up 54, and yarn types 55 based on the tufting machine instructions 39. The yarn type will preferably include denier information so that yarn lengths can be converted to weights. Based upon the pattern information, machine information, and this production and yarn information, the yarn consumption for each needle can be computed 61 and graphically displayed 60 using the tufting machine instructions 39. Then yarn consumption by thread for a particular amount of carpet can be sent to a winder 102,104 to wind yarn cones 106,108 for specific locations in a creel. A set off which would be zero or more to allow for threading up as a creel/tufting machine may be provided with the yarns.

Yarn consumption may be aggregated by yarn group 62 and the relative weight and percentage of each yarn group can be visualized, and then compared to existing inventory and orders if necessary. By utilizing the tufting machine instructions 39 extending precise yarn lengths may be calculated in an effort to minimize waste. A variety of operations may be executed upon the yarn consumption data 63. For instance, after data is changed, yarn consumption by needle can be calculated 64. A report of this data may be printed, or that data can be saved, a set of saved date can be loaded, or the data can be cleared for the entry of new yarn plan data.

Figure 6:
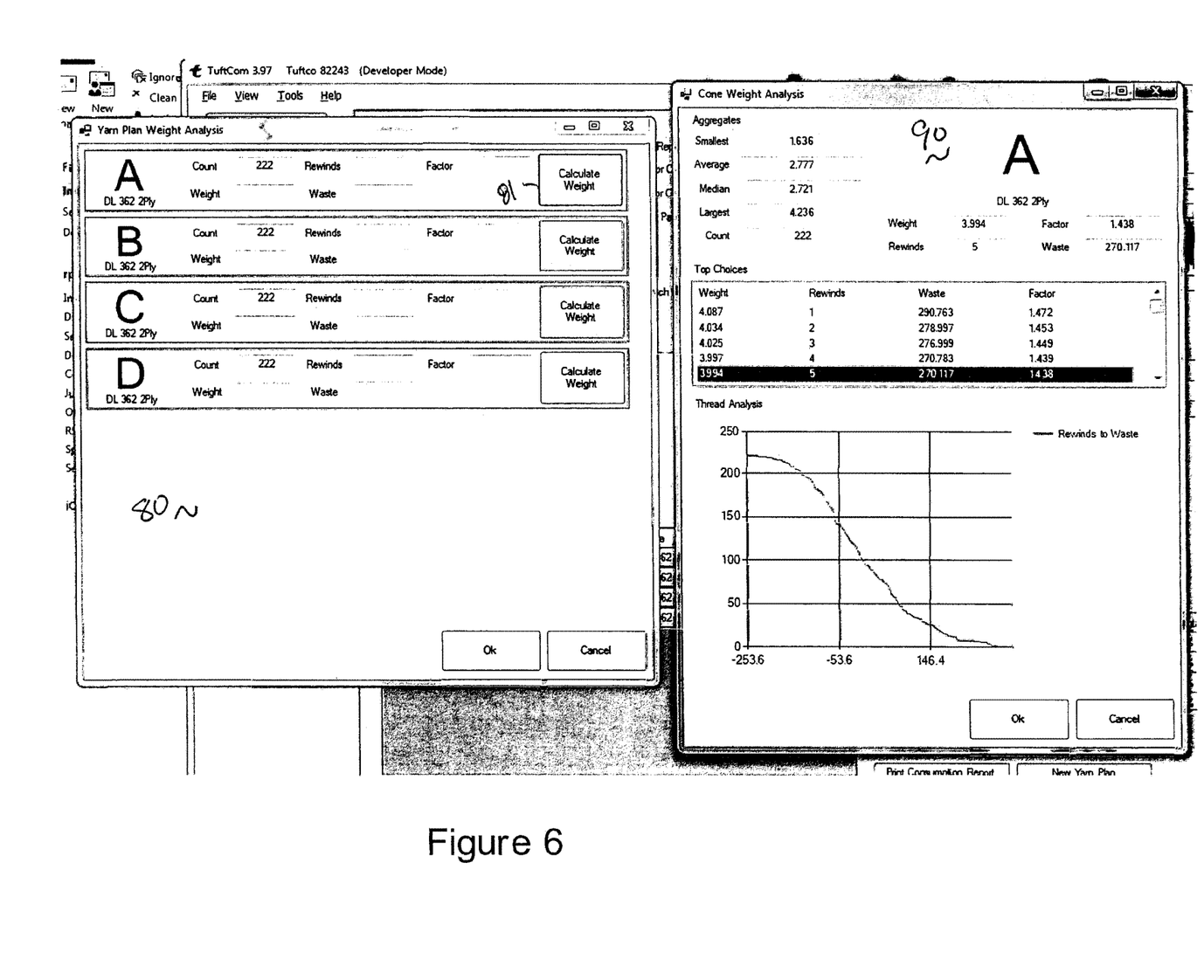
FIG. 6 is an exemplary control screen display for analyzing waste and required rewinds for a variety of yarn cone winding options.

Selecting the Order Calculator feature 65 generates the Yarn Plan Weight Analysis view 80 of FIG. 6. This view shows the needle or end count for each yarn group A, B, C, and D in the illustrated example. It is possible that patterns may have more or less yarn groups. The Calculate Weight functionality 81 generates the Cone Weight Analysis view 90. This view shows the various cone weights of yarn for the selected yarn group required for the production target—the largest, smallest, median, and average cone weights. The operator can then select the number of yarn cones that may be specially rewound to add yarn (or alternatively replaced during production) with a view to the total weight of wasted yarn. Weight is provided because the yarn denier is known, but in the absence of that information, the total length of yarn that would be "waste" for salvage purposes would be shown. The yarn cone weight analysis 90 provides an analysis of the number of yarn cone rewinds (replacements) in comparison to the amount of waste yarn that must be salvaged after the production run.

Based upon this information, the operator of the yarn planner software can select the most desirable yarn cone weight for each position in a creel to result in minimization of the cost of salvaged yarn and labor attendant with rewinds during the production run. The analysis also generates a ratio of the yarn cone weight selected to the average weight of all cones in the group. In the illustrated example, the highlighted weight for the yarn cones, requiring 5 rewinds, is 3.994 pounds. When this weight is divided by the average yarn weight required (2.777 pounds), it provides a factor or ratio of 1.438. This ratio may be used in future production planning for different target production lengths, to provide similarly useful results without repeating all of the calculations and decision process.

It is anticipated that additional visual presentations of the yarn consumption data may be created. For instance, there may be some clusters of yarn cone weights that are particularly common in a pattern and that would justify dividing a single yarn group, such as the A yarns, in to two or more subgroups. While this would complicate the loading of the creel, it could nonetheless provide valuable savings in waste yarn and rewinds.

Accordingly, as reflected in FIG. 3, an optimized yarn planning process may involve creating a pattern 28, loading the pattern into a tufting machine or desktop simulator 30, designating the machine configuration 31, designating the shift pattern for the machine configuration (if not already included in the pattern file) 32, setting a stitch rate reflective of the number of yarn bights intended to be visible over a specified longitudinal distance of backing 33, designating a production objective 34, assigning yarns and yarn information to pattern colors (and specifying yarn feed increments if not already included in the pattern file) 37, computing yarn consumption by needle 71 based on tufting machine instructions 39, optionally displaying visual representations of yarn consumption by needle or by yarn type 72, grouping yarn consumption by needle according to yarn type/color for analysis 73, selecting individual yarn types/colors to display analysis of yarn consumption across needles carrying the selected yarn 74, displaying an analysis of yarn waste and labor/rewinds attendant to different yarn cone weights/winding lengths 75, selecting a desired yarn cone weight/winding length for each individual yarn type/color 76.

The applicant has continued to develop yarn planning sophistication so as to be able to utilize the exact same pet file provided to a tufting machine to run the carpet and simulation so as to know relatively exactly how much yarn will be used during the tufting process. The accuracy of the calculations have improved over time. Utilizing the same pct files that run the tufting machines the linear lengths of yarn provided on each yarn cone can be calculated which could also be converted to weight for ease of winding cones. This information can be transferred to a winder or warper preferably in an automated fashion so as to wind unique cones for a particular run of the tufting machine with possibly a small amount of extra yarn included for the set up so as to precisely provide yarn cones for a desired amount of a carpet run of a set pattern using the tufting machine instructions 39 rather than stitching simulations.

Figure 7:
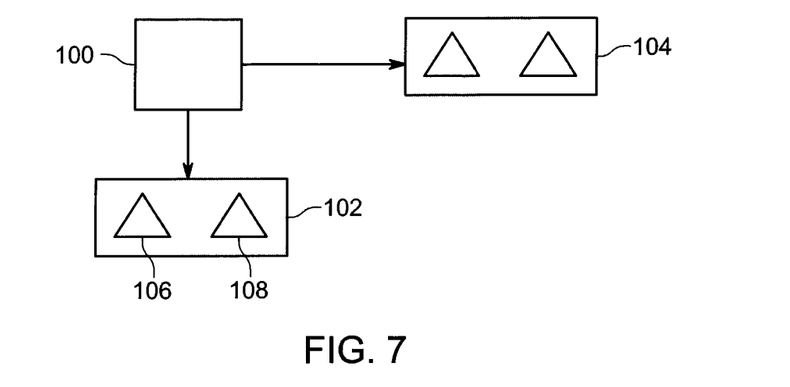
FIG. 7 is a diagramic representation of a computer/tufting machine directing winders to wind cones.

FIG. 7 shows the sending of the information from the yarn planner or tufting machine to winders or warpers or other ways of making beams or cones so as to provide the specific amount of yarn for each specific location to be tufted by the tufting machine.

Figure 8:
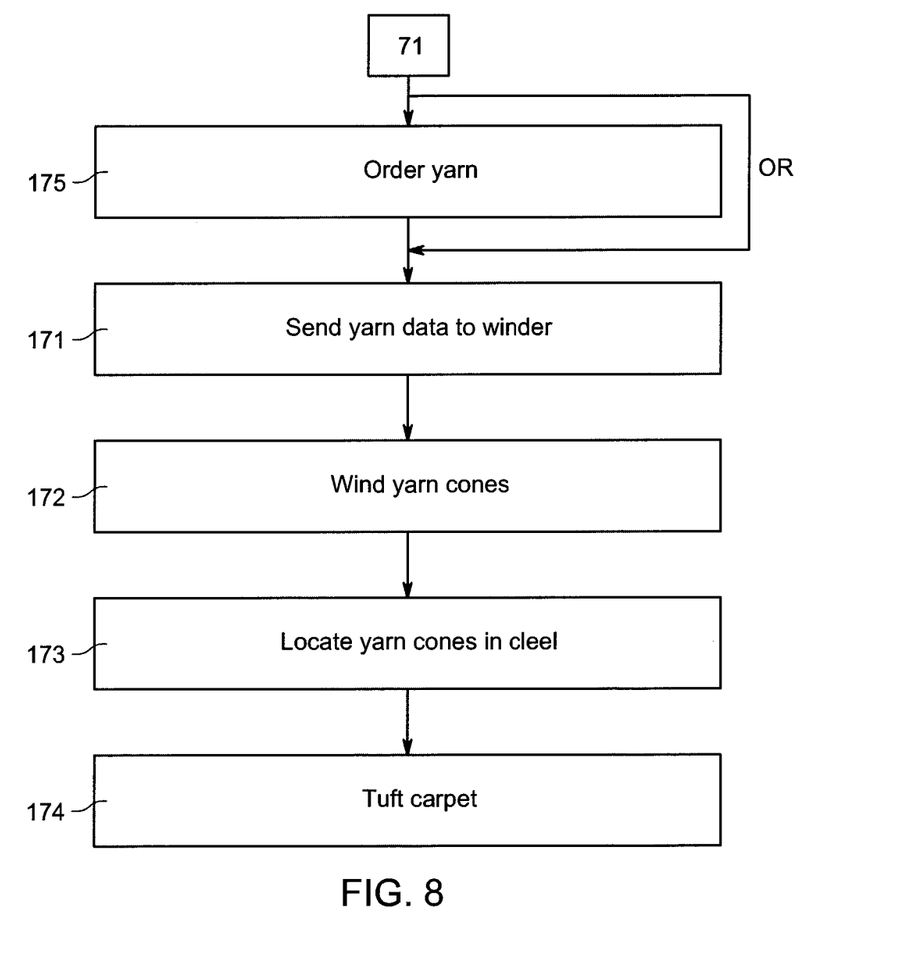
FIG. 8 is a portion of a flow diagram as a possible substitute of a portion of FIG. 3.

FIG. 8 shows an alternative ending to FIG. 3 beginning at step 71 with the information from step 71 and proceeding to step 171 and 175 where either yarn as ordered for a specific run of carpet or a specific job or yarn data is sent to the winder at step 171 so as to wind the yarn cones in step 172 to then locate the yarn cones and creel at step 173 and tuft carpet at step 174. Utilizing this technology extremely little waste will be experienced since the cones can be wound such as cones 106,108 can be wound with almost the exact amount needed for a particular run plus potentially a little extra for the setup. This technology continues to progress as it is possible that the winders 102,104 may have the yarn cones 106,108 removed by robots and installed on the creel so as to remove many of the steps currently performed by people. Also, at step 175 information received relative to the amount of yarn needed may be utilized to order yarn at step 175 to assist in planning purposes as jobs are being lined up for a particular tufting machine.

Additionally, as the software and sophistication continues to evolve, simpler systems may be provided for simpler tufting machines which provide the pattern on the pct files. More complex analysis of each particular length of yarn may be performed for other tufting machines.

The yarn planner implemented on the machine 100 may utilize the same files that operate the tufting machines to calculate the displacement yarn which then can be converted to weight and/or length by the winders 102,104. Such factors as double density yarn and other variables may be accounted for by the software in performing the calculations of how much yarn is needed. Calculations may employ approximations which has been found satisfactory for calculating actual yarn utilized by some machines. Additionally, some machines shift yarn either by shifting needles or shifting backing and this shift can be accounted for by the machine 100 utilizing the yarn planning software of this invention.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method for yarn planning in the manufacture of tufted patterns from pixel mapped designs comprising:
   loading a pixel-mapped design file into a tufting machine interface or simulator;
   designating pattern characteristics including shift pattern and effective stitch rates;
   designating a production target as a pattern;
   assigning yearns to the pattern;
   computing yarn consumption by needle based on the tufting machine instructions generated to operate a tufting machine; and then winding at least one yarn cone with a set off and the yarn consumption with a yarn.

2. The method of claim 1 further comprising the step of checking inventory to identify if the yarn is available on hand before the winding step.

3. The method of claim 2 further comprising the step of automatedly providing wound cones to a creel from a winder.

4. The method of claim 3 when the step of providing wound cones to the creel comprises a robot transporting the wound cones between the winder and the creel.

5. The method of claim 1 further comprising providing a plurality of yarn cones.

6. The method of claim 1 further comprising the step of tufting carpets.

* * * * *

UNITED STATES PATENT AND TRADEMARK OFFICE
CERTIFICATE OF CORRECTION

Page 1 of 1

PATENT NO. : 12,254,248 B2
APPLICATION NO. : 17/879284
DATED : March 18, 2025
INVENTOR(S) : Rob Padgett It is certified that error appears in the above-identified patent and that said Letters Patent is hereby corrected as shown below:

In the Claims

Claim 1, Column 8, Line 64: "assigning yearns to the pattern;" should read --assigning yarns to the pattern;--

Signed and Sealed this
Thirteenth Day of May, 2025

Coke Morgan Stewart
*Acting Director of the United States Patent and Trademark Office*